US005885038A

United States Patent [19]
Huber

[11] Patent Number: 5,885,038
[45] Date of Patent: Mar. 23, 1999

[54] MACHINE FOR FINISHING THE TOOTH FLANKS OF GEAR-SHAPED WORKPIECES WITH AN INTERNAL GEAR TOOL

[75] Inventor: Manfred Huber, München, Germany

[73] Assignee: The Gleason Works, Rochester, N.Y.

[21] Appl. No.: 938,977

[22] Filed: Sep. 26, 1997

[30] Foreign Application Priority Data

Oct. 1, 1996 [DE] Germany ....................... 296 17 120 U

[51] Int. Cl.[6] ........................................ B23F 1/00

[52] U.S. Cl. ............................ 409/7; 198/346.2; 409/38; 451/147; 451/219; 451/401

[58] Field of Search .................................. 409/38, 50, 7, 409/6; 198/396.2; 451/401, 334, 219, 253, 147

[56] References Cited

U.S. PATENT DOCUMENTS

| | | | |
|---|---|---|---|
| 4,359,301 | 11/1982 | Spensberger et al. | 451/147 |
| 4,519,733 | 5/1985 | Gregg | 198/346.2 |
| 4,531,327 | 7/1985 | Dzewaltowski et al. | 451/401 |
| 4,744,707 | 5/1988 | Negri et al. | 409/7 |
| 4,950,112 | 8/1990 | Huber | 451/147 |
| 5,443,338 | 8/1995 | Huber et al. | 409/7 |

*Primary Examiner*—Andrea L. Pitts
*Assistant Examiner*—Adesh Bhargava
*Attorney, Agent, or Firm*—Robert L. McDowell

[57] ABSTRACT

Machine comprising a main frame (1), machine bed (2), headstock (3) and tailstock (4) with means (17, 18) for mounting of the work for rotation about a work axis (C2), the means being disposed on the machine bed, with the headstock being movable in a direction (Z-axis) parallel to the work axis (C2). The machine also includes a slide system supported by the main frame (1) comprising two controlled-drive slides (7, 10), of which one (10) is displaceable in a direction (Y-axis) perpendicular to the work axis (C2), and the other (7) in a direction (X-axis) perpendicular to the Y and Z axes. Further included is a cradle (12) supported by the slide system (7, 10) and holding a tool head (13) for angular setting about an axis (A) perpendicular to the work axis (C2), the tool head being disposed between the headstock and tailstock. An internal gear tool is mounted in the tool head (13) for rotation about a tool axis (C1), with a controlled relative movement being provided in the Z-direction between the tool and the work. The inventive machine is characterized by the inclusion of a first horizontal slide (5) arranged on the main frame and movable in the Z-direction, the first horizontal slide (5) supporting a vertical slide (7) arranged for displacement in the X-direction. The vertical slide (7) supports a second horizontal slide (10), movable in the Y-direction, and the second horizontal slide (10) supports the cradle accommodating the tool head in a manner swivelable about the A-axis parallel to the X-direction. The tailstock is arranged fixedly on the machine bed.

4 Claims, 3 Drawing Sheets

MACHINE FOR FINISHING THE TOOTH FLANKS OF GEAR-SHAPED WORKPIECES WITH AN INTERNAL GEAR TOOL

FIELD OF THE INVENTION

The invention relates to a machine for finishing the tooth flanks of gear-shaped workpieces with an internal gear tool.

BACKGROUND OF THE INVENTION

A machine for finishing the tooth flanks of gear-shaped workpieces with an internal gear tool is known to comprise:

a) a main frame with a machine bed, b) a headstock and a tailstock with devices for rotatably driven mounting of the work to be machined, said devices being disposed on the machine bed, with the headstock adapted for controlled driving for movement in a Z-direction, that is, in the direction of the work axis, c) a slide system supported by the main frame and comprising two controlled-drive slides, of which the one is displaceable in a Y-direction, i.e., perpendicular to the axis of the work being machined, and the other in an X-direction, i.e., perpendicular to the Y- and Z-direction, d) a cradle supported by the slide system and holding a tool head adapted for angular setting about an axis perpendicular to the work axis, the tool head being disposed between the headstock and the tailstock, and e) an internal gear tool mounted in the tool head and allowing rotatable driving, with a controlled relative movement being provided in the Z-direction between the tool and the work.

The above machine is described in DE 43 23 935 C1 which corresponds to U.S. Pat. No. 5,443,338 to Huber et al. the disclosure of which is hereby incorporated by reference. This prior machine possesses a main frame having approximately the shape of a flat-lying T. The region corresponding to the cross bar of the T, on the machine front, forms a machine bed on which are disposed a headstock and a tailstock, both adapted for controlled driving to move in the direction of the work axis. Arranged in the other area of the main frame, extending to the rear, is a horizontal slide adapted for displacement and to be driven perpendicularly to the work axis. Arranged on the side of the horizontal slide facing the machine bed is a displaceable, driven vertical slide. On its side facing the machine bed, the vertical slide features a cradle accommodating a tool head in a manner allowing angular adjustment about a horizontal axis that is perpendicular to the work axis.

This prior machine is very rigid and, therefore, suited particularly for machining large workpieces. For mounting a workpiece, the headstock and the tailstock are displaced jointly on the machine bed. For reason of accessibility, the mounting or release position is located outside the work space, beyond the main frame region extending toward the rear. The clearance between the receiving/release position and the working position inside the machine amounts to approximately 700 mm. This displacement travel of the headstock makes itself felt with respect to the work changing time and requires an appropriate machine bed and, thus, an appropriate floor space for the machine.

The objective underlying the present invention is to create a machine suited for smaller workpieces, with the clearance between the workpiece receiving/releasing position and the working position being as short as possible so as to achieve a favorable ratio of work change times to machining times.

The inventional machine allows the arrangement of the receiving and releasing position of a workpiece in the machine within a relatively short distance from the machining position. The time required for the work movement between these two positions, therefore, is short and the machine bed can be configured relatively short.

SUMMARY OF THE INVENTION

The present invention is directed to a machine for finishing tooth flanks or gear-shaped workpieces (W) with an internal gear tool (T)

The machine comprises a main frame (1) with a machine bed (2), a headstock (3) and a tailstock (4) each with means (17, 18) for mounting of the work (W) for rotation about a work axis (C2), the means being disposed on the machine bed (2), with the headstock (3) being movable in a direction (Z-axis) parallel to the work axis (C2). The machine also includes a slide system supported by the main frame (1) comprising two controlled-drive slides (7, 10), of which the one (10) is displaceable in a direction (Y-axis) perpendicular to the work axis (C2), and the other (7) in a direction (X-axis) perpendicular to the Y and Z axes. Further included is a cradle (12) supported by the slide system (7, 10) and holding a tool head (13) for angular setting about an axis (A) perpendicular to the work axis (C2), the tool head (13) being disposed between the headstock (3) and the tailstock (4). An internal gear tool (T) is mounted in the tool head (13) for rotation about a tool axis (C1), with a controlled relative movement being provided in the Z-direction between the tool (T) and the work (W).

The inventive machine is characterized by the inclusion of a first horizontal slide (5) arranged on the main frame (1) and movable in the Z-direction, the first horizontal slide (5) supporting a vertical slide (7) arranged for displacement in the X-direction. The vertical slide (7) supports a second horizontal slide (10), movable in the Y-direction, and the second horizontal slide (10) supports the cradle (12) accommodating the tool head (13) in a manner swivelable about the A-axis parallel to the X-direction. The tailstock (4) is arranged fixedly on the machine bed (2).

DETAILED DESCRIPTION OF THE INVENTION

An exemplary embodiment of the invention is more fully illustrated hereafter with the aid of the drawings.

Figure 1:
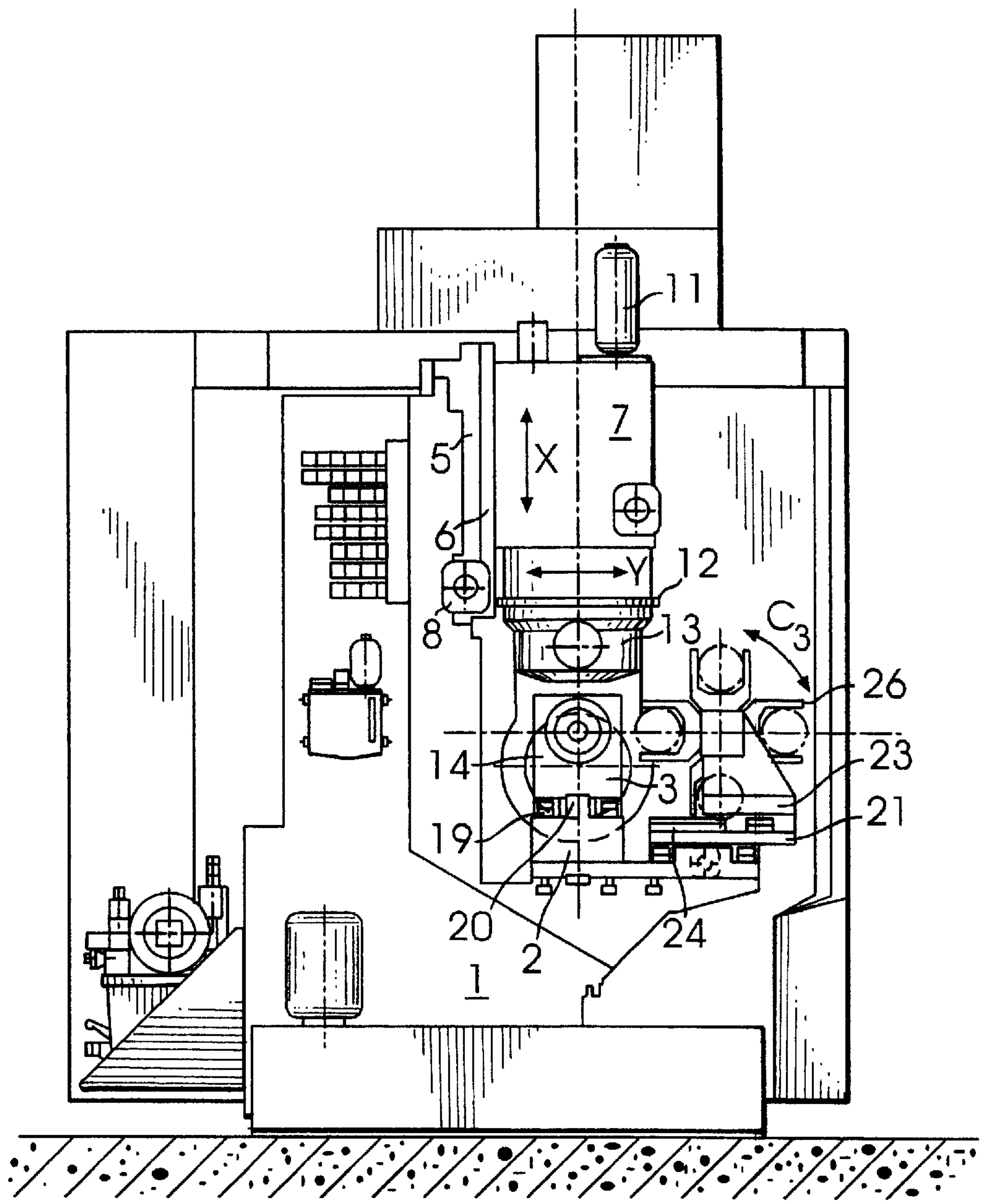
FIG. 1 illustrates a side view of the inventive machine for finishing tooth flanks of gear-shaped workpieces with an internal gear tool.
Figure 2:
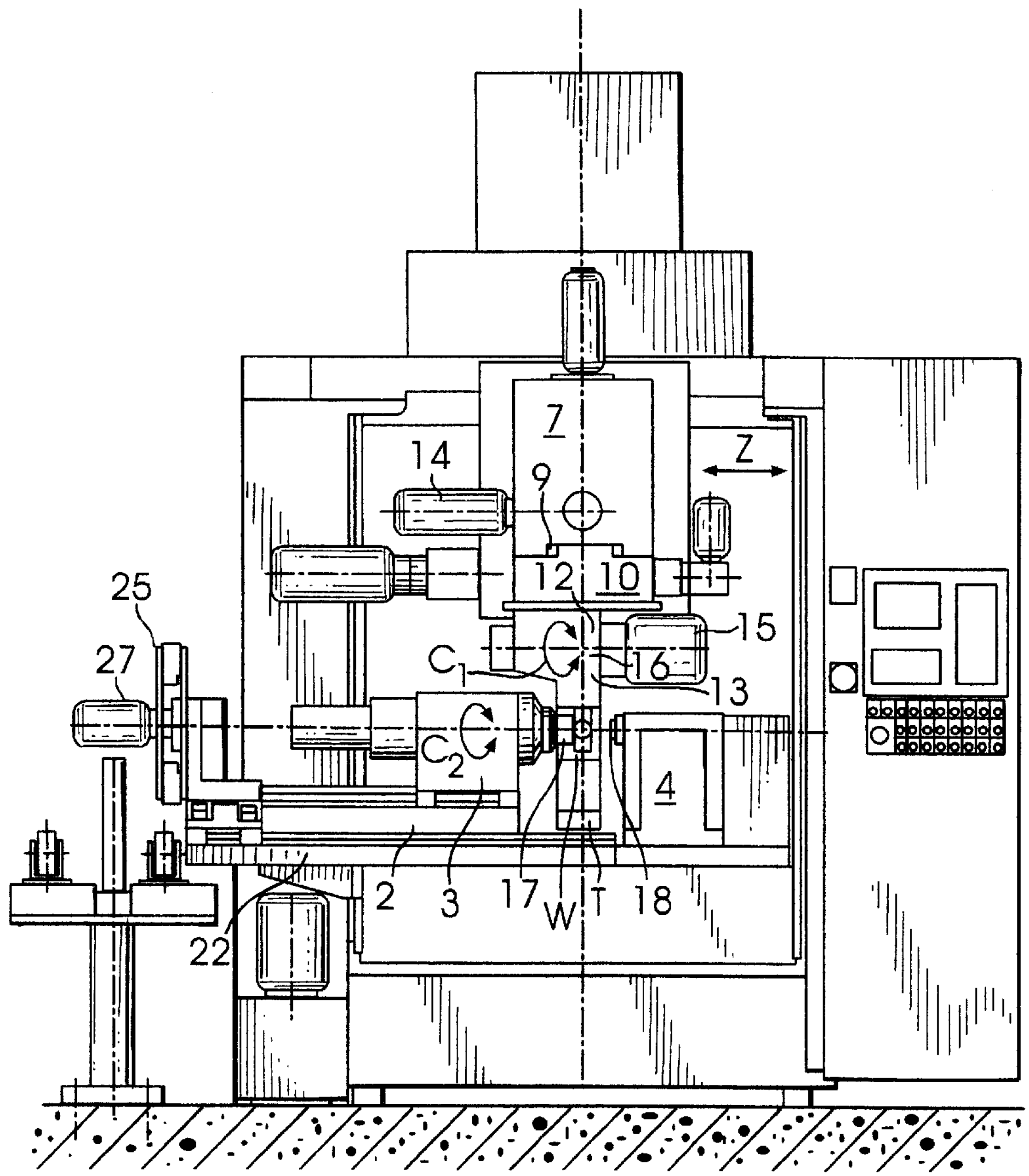
FIG. 2 shows a front view of the machine of FIG. 1.
Figure 3:
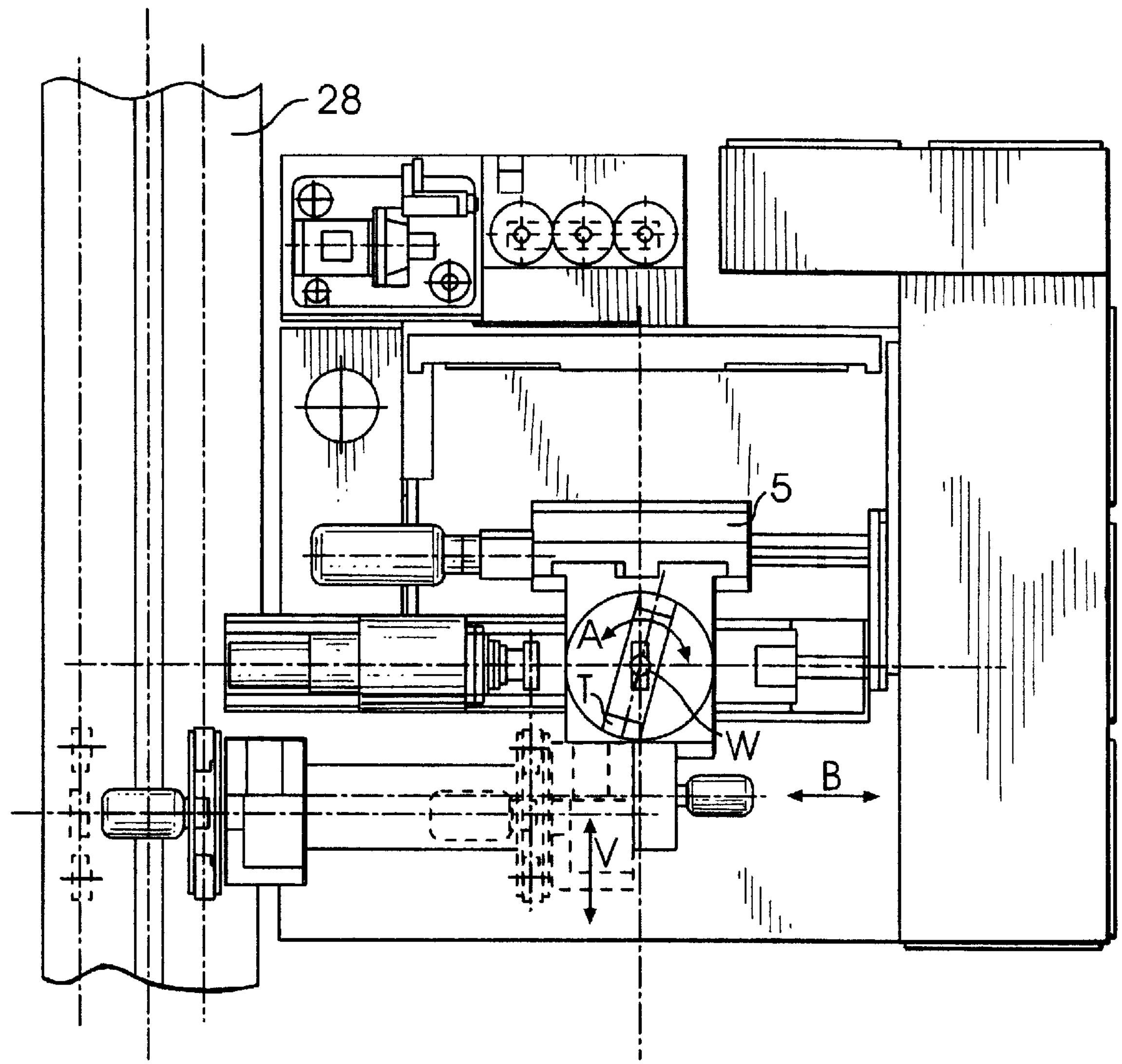
FIG. 3 illustrates a plan view of the machine according to FIG. 1.

The machine illustrated in FIGS. 1 through 3 features a main frame 1 having approximately the shape of an upright L. The region corresponding to the cross bar of the L, on the machine front, forms a machine bed 2 on which are arranged a movable headstock 3 and a fixed tailstock 4. Arranged in the other region of main frame 1, extending upward perpendicularly to the main frame 2, a first horizontal slide 5 is displaceable in the direction of arrow Z in a base guideway, featuring a motor 8 to provide the drive for said motion. The first horizontal slide 5 possesses on its front a vertical guideway 6 in which a vertical slide 7 is arranged, adapted for being driven by a motor 11 for vertical displacement in the direction of arrow X. The vertical slide 7 possesses on its underside facing the machine bed 2 a horizontal guideway 9, in which a second horizontal slide 10 is arranged, adapted for being driven by a motor 14 for horizontal displacement in the direction of arrow Y. Each of the arrowed directions X, Y and Z extends perpendicularly to the other two.

On its underside facing the machine bed 2, the second horizontal slide 10 features a cradle 12 in which a tool head 13 is accommodated in a manner allowing angular adjustment about an axis A extending in the X-direction. The tool head 13 protrudes substantially between the headstock 3 and tailstock 4. An internal gear tool T, adapted to be driven rotatably, is received in a central opening of the tool head 13. The drive is provided by a motor 15 via an only indicated gearbox 16 with no-backlash gears or by direct drive using a built-in motor.

The headstock 3 and tailstock 4 are equipped with devices 17, 18 for clamping a gear-shaped workpiece W, which in its machining position is located within the tool T, meshing with it. The work axis C2, the mentioned axis A and, with the tool T not swiveled, the tool axis C1 are situated in one plane.

The tool T is normally an internal honing gear or a hard gear-shaving cutter or the like with an abrasive surface on its tooth flanks (i.e., a surface not having geometrically defined cutting edges) for finishing specifically hardened workpieces. Instead of an abrasive tool, however, internal gear-shaving cutters with geometrically defined cutting edges on their tooth flanks can also be employed to machine workpieces that have not been hardened.

Finishing with gear-shaped tools proceeds normally with a shaft angle between the tool axis C1 and the work axis C2. To that end, the tool head 13 with the tool T is swiveled about axis A, so that axis C1 is oriented obliquely to axis C2, which extends always in the direction of arrow Z. The infeed of tool T relative to the work W, in the sense of altering the axial clearance, is effected by a movement of the vertical slide 7 in the direction of arrow X. For a relative movement between tool T and work W as required in the parallel procedure, use is made of the previously mentioned option of displacing the first horizontal slide 5 in the direction of arrow Z. Superimposed on this movement in the diagonal procedure is a tool T movement perpendicular thereto, which is effected by displacement of the second horizontal slide 10 in the direction of arrow Y, with interpolation of Z and Y. In generating crowned and/or conic tooth flanks, a movement in the direction of arrow X is additionally superimposed on the tool T. The movements X, Y and Z lead with appropriate superimposition to the known spheric process.

When workpieces are changed, the work W is retracted out of the tool T. For that purpose, the headstock 3 is displaced in the direction of arrow Z on the machine bed 2 in a guideway 19, by means of a drive 20. The expert will recognize readily that for engagement and disengagement of a work W with or from the tool T the axial clearance between tool T and work W is altered by movement of the vertical slide 7.

A further feature is that the axes C1 and C2 run, controlled electronically, in a gear coupling adapted for cut-in and cut-out in accordance with the ratio of work teeth to tool teeth. The two axes are driven either by motors and no-backlash gearboxes or by built-in motors on the axes.

The machine with the above structure is equipped with an integrated work manipulation system for moving the work W to a transfer position sideways of the tool head 13 for unloading a machined workpiece, loading a workpiece to be machined as well as for loading and unloading of dressing tools. The machine bed 2 is equipped with a guideway 22 in which a sliding base 21 is arranged for displacement in the direction of arrow W parallel to the direction of arrow Z, driven for that purpose by a motor (not illustrated). The sliding base 21 possesses on its top side a cross guideway 24 in which a cross slide 23 is arranged for displacement in the direction of arrow V parallel to the direction of arrow Y, driven for that purpose by a motor (not illustrated). Mounted rotatably about an axis C3 parallel to the work axis C2, on the cross slide 23, is a turret loader 25 equipped with four grippers 26 offset by 90°. A motor 27 is provided for moving the turret loader to four positions, in which one gripper 26 opposes the work axis C2.

To change a machined work W, the headstock 3 moves away from the stationary tailstock 4 until a work W, held by the mounting device 17 and finish-machined, is located outside the tool T in a transfer position. The transfer position is located within the machine, and the headstock 3 is illustrated in FIG. 3 in the appropriate position. The sliding base 21 is displaced in the direction of arrow B to its position indicated in FIG. 3 by dash-dot line, whereupon the cross slide 23 is displaced in the direction of arrow V, allowing an empty gripper 26 to pick up the machine work W from the mounting device 17. Next, cross slide 23 is retracted somewhat and turned 90°, allowing a gripper 26 carrying an as yet unmachined work W to face the work axis C2. Thereafter, cross slide 23 moves again toward the headstock 3 for transferring the unmachined work W to the mounting device 17. Next, cross slide 23 moves away from the headstock 3 while the sliding base 21 moves then to the left, to a transfer position illustrated in FIG. 2 and 3 by solid lines. The headstock 3 moves at the same time to the right, to the working position, fixing the unmachined work W between the mounting devices 17 and 18. With the sliding base 21 positioned as shown in FIGS. 2 and 3, the turret loader 25 surrenders the machined work W upon appropriate rotation to a magazine 28. Once one of the grippers 26 has picked up an unmachined workpiece W, the sliding base 21 moves again to the right, to its transfer position indicated in FIG. 3 by dash-dot lines. The clearance between the working position of headstock 3 as shown in FIG. 2 and its transfer position as shown in FIG. 3 amounts to approximately 300 mm, so that the movement between these two positions requires relatively little time.

Arranged in the magazine 28, besides the unmachined workpieces W, are also two dressing tools. Once a preset number of workpieces W have been machined, a dressing tool can be supplied to the machine, instead of a new workpiece W to be machined, with which dressing tool the tool T can be dressed and restored to proper operating condition.

To allow insertion of dressing tools of different diameter and different width into the machine, the invention also provides for configuring at least two of the four grippers 26 of turret loader 25 with different gripping diameter and different gripping width.

It needs no further elaboration that the movements of the headstock 3, mounting devices 17, 18, and the slides 5, 7 and 10 supporting the tool head 13, as well as of the slides 21 and 23 supporting the turret loader 25, the rotary movement of the turret loader 25 and the movement of the grippers 26 can be controlled automatically using an appropriate program.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A machine for finishing tooth flanks or gear-shaped workpieces with an internal gear tool, said machine comprising:

a main frame with a machine bed, a headstock and a tailstock each with means for mounting of the work for rotation about a work axis (C2), said means being disposed on the machine bed, with the headstock being movable in a direction (Z-axis) parallel to the work axis (C2), a cradle supported by the slide system and holding a tool head for angular setting about an axis (A) perpendicular to the work axis (C2), the tool head being disposed between the headstock and the tailstock, and, an internal gear tool mounted in the tool head for rotation about a tool axis (C1), with a controlled relative movement being provided in the Z-direction between the tool and the work, the improvement comprising:

a first horizontal slide being arranged on the main frame, and movable in the Z-direction;

said first horizontal slide supporting a vertical slide arranged for displacement in the X-direction;

said vertical slide supporting a second horizontal slide, movable in the Y-direction;

said second horizontal slide supporting the cradle accommodating the tool head in a manner swivelable about the A-axis parallel to the X-direction; and, said tailstock being arranged fixedly on the machine bed.

2. The machine according to claim 1, further comprising an integrated work manipulation system for feeding the workpiece to a first transfer position sideways of the tool head and for removal of a machined workpiece from the first transfer position, and for supplying a dressing tool to said first transfer position and removing a dressing tool from the first transfer position, said machine further including:

a sliding base arranged on the machine bed, said sliding base being movable in a direction (U-axis) parallel to the Z-direction for a movement between the first transfer position in the region of the tool and a second transfer position remote from said first transfer position, a cross slide arranged on the sliding base and movable in a direction (V-axis) perpendicular to the U-direction;

a turret loader mounted on the cross slide, said turret loader being rotatable about an axis (C3) parallel to the work axis (C2) and positionable in several angular positions, the turret loader supporting several grippers.

3. A machine according to claim 2 wherein the turret loader allows positioning in four positions offset by 90° and supports four grippers, of which at least two are configured with a different gripping diameter and a different gripping width.

4. A machine according to claim 1 further comprising a built-in motor arranged in the headstock, said motor providing direct drive for the work, and a built-in motor arranged in the tool head providing direct drive for the tool.

* * * * *